United States Patent
Azuma et al.

(10) Patent No.: US 7,354,961 B2
(45) Date of Patent: Apr. 8, 2008

(54) AQUEOUS INK FOR INK JET RECORDING

(75) Inventors: Koji Azuma, Wakayama (JP); Takehiro Tsutsumi, Wakayama (JP); Ryuma Mizushima, Wakayama (JP); Hirotaka Takeno, Wakayama (JP); Toshiya Iwasaki, Wakayama (JP)

(73) Assignee: Kao Corporation, Tokyo (JP)

( * ) Notice: Subject to any disclaimer, the term of this patent is extended or adjusted under 35 U.S.C. 154(b) by 559 days.

(21) Appl. No.: 10/879,190

(22) Filed: Jun. 30, 2004

(65) Prior Publication Data

US 2005/0009977 A1 Jan. 13, 2005

(30) Foreign Application Priority Data

Jul. 4, 2003 (JP) ............................. 2003-191863

(51) Int. Cl.
*C09D 11/00* (2006.01)
(52) U.S. Cl. .................. 523/160; 523/161; 523/200; 523/205; 524/556; 524/577
(58) Field of Classification Search ................ 523/160, 523/161, 200, 205; 524/556, 577
See application file for complete search history.

(56) References Cited

U.S. PATENT DOCUMENTS

| | | | |
|---|---|---|---|
| 4,166,811 A * | 9/1979 | Marr et al. .................. | 523/202 |
| 5,106,417 A | 4/1992 | Hauser et al. | |
| 5,310,778 A | 5/1994 | Shor et al. | |
| 5,366,546 A | 11/1994 | McCrae et al. | |
| 6,723,785 B2 * | 4/2004 | Hama et al. ................. | 524/556 |
| 6,740,690 B2 * | 5/2004 | Nakano et al. .............. | 523/160 |
| 2003/0225185 A1 * | 12/2003 | Akers et al. ................. | 523/160 |
| 2006/0089424 A1 * | 4/2006 | Sanada et al. .............. | 523/160 |
| 2006/0189717 A1 * | 8/2006 | Johnson et al. ............. | 523/160 |

FOREIGN PATENT DOCUMENTS

| | | | |
|---|---|---|---|
| JP | 5-230390 | | 9/1993 |
| JP | 2512861 | | 4/1996 |
| JP | 10-36732 | | 2/1998 |
| JP | 2919045 | | 4/1999 |
| JP | 2002-20656 | | 1/2002 |
| JP | 2003064292 A | * | 3/2003 |
| JP | 2004051963 A | * | 2/2004 |

OTHER PUBLICATIONS

Machine Translation of JP 2003-064292 A (2003).*
Machine Translation of JP 2004-051963 A (2004).*

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention provides a process for producing a water dispersion for ink jet recording, which comprises the following steps 1 and 2:
(Step 1) a step of obtaining a pigment treated with (a) a water-insoluble vinyl polymer particles by making a pigment and (a) a water-insoluble vinyl polymer particles present in an aqueous solvent and then removing the solvent; and
(Step 2) a step of obtaining a water dispersion of a pigment-containing water-insoluble vinyl polymer particles by dispersing a mixture comprising the water-insoluble vinyl polymer particle (a)—treated pigment obtained in step 1, an organic solvent, (b) a water-insoluble vinyl polymer and water and then removing the organic solvent.

11 Claims, No Drawings

AQUEOUS INK FOR INK JET RECORDING

FIELD OF THE INVENTION

The present invention relates to a process for producing a water dispersion for ink jet recording, a water dispersion obtained by the process, and an aqueous ink for ink jet recording.

BACKGROUND OF THE INVENTION

The ink jet recording system is a recording system wherein ink droplets are discharged and jetted directly through very fine nozzles onto a recording member and allowed to adhere thereto to give letters and images. This system is widely used because of advantages not only in low noise and easy operation of a device used, but also in easy coloration and usability of paper as a recording member. As the ink used in an ink jet printer, a pigment-based ink is used in recent years in order to improve water resistance and light fastness.

However, the pigment is insoluble in a medium, and thus the pigment-based ink is easily agglomerated and often problematic in ink dispersion stability and jetting ability.

To improve the dispersion stability of pigment particles, Japanese Patent No. 2,512,861 and the equivalent thereto, U.S. Pat. No. 5,310,778, discloses techniques wherein a pigment and a water-soluble polymer are introduced into a roll mill and milled to give a dispersion of the pigment and water-soluble polymer dispersant prior to preparation of an ink liquid, Japanese Patent No. 2,919,045 and the equivalent thereto, U.S. Pat. No. 5,106,417, proposes a solid pigment preparation containing a carboxyl-containing polyacrylic resin, and JP-A 2002-20656 proposes use of a pigment milled in the presence of fine polymer particles dispersed in an aqueous medium.

JP-A 5-230390 and the equivalent thereto, U.S. Pat. No. 5,366,546, and WO-A 96/2302 and the equivalent thereto, U.S. Pat. No. 5,490,047, disclose a water-soluble polymer. JP-A 10-36732 discloses a dispersion in water of a pigment treated with rosin and microcapsulated.

SUMMARY OF THE INVENTION

The present invention provides a process for producing a water dispersion for ink jet recording having the following steps 1 and 2, a water dispersion for ink jet recording obtained by the process, and an aqueous ink for ink jet recording containing the water dispersion.

(Step 1) a step of obtaining a pigment treated with (a) a water-insoluble vinyl polymer particles by making a pigment and (a) a water-insoluble vinyl polymer particles present in an aqueous solvent and then removing the solvent; and (Step 2) a step of obtaining a water dispersion of a pigment-containing water-insoluble vinyl polymer particles by dispersing a mixture comprising the water-insoluble vinyl polymer particle (a)—treated pigment obtained in step 1, an organic solvent, (b) a water-insoluble vinyl polymer and water and then removing the organic solvent.

DETAILED EXPLANATION OF THE INVENTION

However, the above shown prior arts are insufficient in dispersion stability and jetting ability of aqueous ink, and further improvements are required.

The present invention is to provide a process for producing a water dispersion excellent in dispersion stability and jetting ability, superior in water resistance and rub fastness, and suitable for aqueous ink capable of conferring high optical density, a water dispersion for ink jet recording using the same, and an aqueous ink for ink jet recording containing the same.

The aqueous ink of the invention can be used as an aqueous ink for ink jet recording, which produces a high optical density and is excellent in dispersion stability and jetting ability and then in water resistance, light fastness and rub fastness.

In the present invention, the term "aqueous" in the "aqueous ink for ink jet recording" means that water accounts for the highest percentage in a solvent contained in the aqueous ink, wherein the percentage of water may be 100% by weight, and the solvent may be a mixture of water and one or more organic solvents insofar as it satisfies the above requirement.

Hereinafter, the water dispersion used in the aqueous ink of the present invention and the aqueous ink for ink jet recording using the water dispersion are in detail described along with the process for producing the same. Hereinafter, the process is described in detail by reference to the respective production steps, and the respective steps may be independent steps, or two or more steps may be conducted successively as one step, one step may be divided into two or more steps, or if necessary another known step can be added as a step of producing the ink.

<Step 1>

First, a pigment and a water-insoluble vinyl polymer particles (a) (hereinafter simply called a water-insoluble vinyl polymer particles) are made present in an aqueous solvent and optionally stirred. Then the solvent is removed, followed by milling if necessary, to produce a pigment which has been treated with the water-insoluble vinyl polymer particles. The pigment treated with the water-insoluble vinyl polymer particles is a mixture of the pigment and the water-insoluble vinyl polymer particle. Agglomeration between the pigment particles can be reduced.

The method of making the pigment and the water-insoluble vinyl polymer particles present in an aqueous solvent is not particularly limited. A suspension of the pigment in an aqueous solvent and the water-insoluble vinyl polymer particles dispersed in an aqueous solvent may be mixed with each other. Preferably can be applied a method wherein the dispersion in an aqueous solvent of the water-insoluble vinyl polymer particles is added to the suspension of the pigment in an aqueous solvent and they are stirred.

The suspension of the pigment in an aqueous solvent is preferably one forming pigment crystals in an aqueous solvent of an azo pigment, disazo pigment or the like obtained by coupling reaction. Alternatively, a suspension of the pigment milled in an aqueous solvent may also be used.

Before adding the water-insoluble vinyl polymer particles, a suspension of the pigment in an aqueous solvent may be preferably adjusted to a pH of 4.5 to 10 with a conventional pH adjuster not to make agglomeration of the water-insoluble polymer particles.

The term "aqueous" in the "aqueous solvent" referred to herein has the same meaning as defined above. The aqueous solvent may contain a C1 to C3 fatty alcohol such as methanol, ethanol and propanol, a ketone such as acetone and methyl ethyl ketone, and an ester such as ethyl acetate, in addition to water.

The content of the pigment in the aqueous solvent suspension is preferably 0.5 to 30% by weight, more preferably 1 to 20% by weight.

The content of the water-insoluble vinyl polymer particles in an aqueous solvent is preferably 0.01 to 30% by weight, more preferably 0.1 to 10% by weight.

The content of the aqueous solvent, preferably water, is preferably 60 to 99% by weight, more preferably 70 to 98% by weight.

The average particle diameter of the pigment in the aqueous solvent suspension is preferably 1 to 50 μm from the view point of improving adsorption of the water-insoluble vinyl polymer particles. As the particle size measuring instrument, a laser diffraction/scattering particle-size distribution measuring instrument LA-920 manufactured by Horiba, Ltd. was used.

The average particle diameter of the water-insoluble vinyl polymer in an aqueous solvent is preferably 0.03 to 10 μm as determined by a method of measuring an average particle diameter described later.

In the first step, the ratio of the pigment to the water-insoluble vinyl polymer particles, existing in the aqueous solvent, is preferably 100 parts by weight of the pigment to 1 to 100 parts by weight, more preferably 3 to 30 parts by weight, of the water-insoluble vinyl polymer, from the viewpoint of inhibition of agglomeration of the pigment particles.

After the pigment is brought into contact with the water-insoluble vinyl polymer particles, the solvent is removed. For removal of the solvent, known methods such as reduction in pressure, heating, filtration and the like can be used. The solvent may be removed almost completely or may remain. After the solvent is removed, the content of the remaining solvent in the pigment treated with the water-insoluble polymer particles is preferably 5% or less by weight, more preferably 0.1% or less by weight. After removal of the solvent, the treated pigment may be milled if necessary.

The amount of the water-insoluble vinyl polymer particles (a) used in the step 1 is preferably 5 to 90% by weight, more preferably 10 to 60% by weight, based on the amount of the water-insoluble vinyl polymer used in the steps 1 and 2, that is, the total amount of the water-insoluble vinyl polymer (a) and (b).

The pigment and water-insoluble vinyl polymers (a) and (b) used in this description will be described in detail.

[Pigment]

From the viewpoint of light fastness and water resistance, the pigment may be an organic or inorganic pigment and may be used in combination with an extender pigment if necessary. The extender pigment includes silica, calcium carbonate, talc and the like.

The organic pigment includes, for example, azo pigment, disazo pigment, phthalocyanine pigment, quinacridone pigment, isoindolinone pigment, dioxazine pigment, perylene pigment, perinone pigment, thioindigo pigment, anthraquinone pigment, quinophthalone pigment and the like. From the viewpoint of easiness of production of a suspension of the pigment in an aqueous solvent, azo and disazo pigments are more preferable.

Preferable examples of the organic pigment include C.I. Pigment Yellow 1, 2, 3, 4, 5, 6, 13, 74 and 83, C.I. Pigment Red 1, 3, 4, 6, 37, 38, 41 and 42, C.I. Pigment Orange 13 and 34, and the like.

The inorganic pigment includes carbon black, metal oxides, metal sulfides, metal chlorides and the like. Among these pigments, carbon black is preferable particularly in black aqueous inks. Carbon black includes furnace black, thermal lamp black, acetylene black, channel black and the like.

[Water-insoluble Vinyl Polymer]

The water-insoluble vinyl polymers (a) and (b) may be produced preferably by polymerizing a monomer mixture (hereinafter called monomer mixture) comprising a nonionic monomer (A), a salt-forming group-containing monomer (B) and a hydrophobic monomer (C). Other monomers can also be used in combination in such a range that the problem of the invention can be solved.

By using the nonionic monomer (A) [monomer (A)], there is an advantage that an aqueous ink of low viscosity excellent in the gloss of printed image and superior in jetting properties can be obtained.

The monomer (A) is preferably a monomer represented by the following general formula and is preferably a monomer having an oxyalkylene unit such as an oxyethylene unit, an oxypropylene unit and an oxytetramethylene unit as the structural unit, and p is preferably 2 to 25, meaning the average added mole number.

$$CH_2=CR^1COO(AO)_pR^2$$

wherein AO is a C2 to C4 oxyalkylene unit (provided that (oxyalkylene)$_p$ units may be the same or different), and when the oxyalkylene units are different, they may be added in a block, random or alternate form; $R^1$ represents a hydrogen atom or a methyl group; p is a number of 1 to 50; and $R^2$ represents a hydrogen atom, a C1 to C20 alkyl group, or a phenyl group which may be substituted with a C1 to C9 alkyl group.

The monomer (A) includes methoxy polyethylene glycol mono(meth)acrylate, polyethylene glycol mono(meth)acrylate, methoxypolypropylene glycol mono(meth)acrylate, polypropylene glycol mono(meth)acrylate, ethylene glycol/propylene glycol (meth)acrylate, poly(ethylene glycol/propylene glycol) mono(meth)acrylate, octoxypolyethylene glycol/polypropylene glycol mono(meth)acrylate, octoxy-poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, nonylphenoxy polyethylene glycol/polypropylene glycol mono(meth)acrylate, nonylphenoxy poly(ethylene glycol/propylene glycol) mono (meth)acrylate, propylene glycol/tetramethylene glycol mono(meth)acrylate, poly(propylene glycol/tetramethylene glycol) mono(meth)acrylate, propylene glycol/polybutene glycol mono(meth)acrylate, poly(propylene glycol/butylene glycol) mono(meth)acrylate and the like. These can be used alone or as a mixture of two or more thereof.

Examples of commercially available monomer (A) include NK Ester M-20G, 40G, 90G, and 230G manufactured by Shin-Nakamura Chemical Co., Ltd., and Blenmer PE series, PME-100, 200, 400, 1000, PP-1000, PP-500, PP800, AP-150, AP-40 0, AP-550, AP-800, 50PEP-300, 70PEP-350B, AEP series, 30PPT-800, 50PPT-800, 70PPT-800, APT series, 10PPB-500B, 10APB-500B, 50POEP-800B, 50AOEP-800B, ASEP series, PNEP series, PNPE series, 43ANEP-500, 70ANEP-550 and the like manufactured by Nippon Oil and Fats Co., Ltd.

The salt-forming group-containing monomer (B) [monomer (B)] is preferably an anionic monomer or a cationic monomer. The anionic monomer and cationic monomer can be used alone or as a mixture of two or more thereof.

The anionic monomer includes at least one kind of monomer selected from an unsaturated carboxylic acid monomer, an unsaturated sulfonic acid monomer and an unsaturated phosphoric acid monomer.

The unsaturated carboxylic acid monomer includes acrylic acid, methacrylic acid, crotonic acid, itaconic acid, maleic acid, fumaric acid, citraconic acid, 2-methacryloyloxymethylsuccinic acid, and the like. These can be used alone or as a mixture of two or more thereof.

The unsaturated sulfonic acid monomer includes styrenesulfonic acid, 2-acrylamide-2-methylpropanesulfonic acid, 3-sulfopropyl (meth)acrylate, bis-(3-sulfopropyl) itaconate and the like. These can be used alone or as a mixture of two or more thereof.

The unsaturated phosphoric acid monomer includes vinylsphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate and the like. These can be used alone or as a mixture of two or more thereof.

Among the anionic monomers, the unsaturated carboxylic acid monomer is preferable, and acrylic acid and methacrylic acid are more preferable, from the viewpoint of dispersion stability and jetting ability.

The cationic monomer includes at least one member selected from the group consisting of an unsaturated tertiary amine-containing vinyl monomer and an unsaturated ammonium salt-containing vinyl monomer.

The unsaturated tertiary amine-containing monomer includes N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, N,N-dimethyl arylamine, vinyl pyrrolidone, 2-vinyl pyridine, 4-vinyl pyridine, 2-methyl-6-vinyl pyridine, 5-ethyl-2-vinyl pyridine and the like. These can be used alone or as a mixture of two or more thereof. The (meth) acrylate refers to both methacrylate and acrylate. This also applies hereinafter.

The unsaturated ammonium salt-containing monomer includes a quaternary product of N,N-dimethylaminoethyl (meth)acrylate, a quaternary product of N,N-diethylaminoethyl (meth)acrylate, a quaternary product of N,N-dimethylaminopropyl (meth)acrylate, and the like. These can be used alone or as a mixture of two or more thereof.

Among the cationic monomers, N,N-dimethylaminoethyl (meth) acrylate, N,N-dimethylaminopropyl (meth) acrylamide and vinyl pyrrolidone are preferable.

The hydrophobic monomer (C) [monomer (C)] includes alkyl (meth)acrylate, an aromatic ring-containing monomer, a macromer and the like. These can be used alone or as a mixture of two or more thereof. Among these, at least one member selected from the group consisting of an aromatic ring-containing monomer and a macromer is preferably contained from the viewpoint of optical density, water resistance and rub fastness.

The alkyl (meth)acrylate includes (meth)acrylates whose ester moiety is an alkyl group having 1 to 22 carbon atoms, such as methyl (meth)acrylate, ethyl (meth)acrylate, (iso) propyl (meth)acrylate, (iso or tertiary) butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate, and these monomers can be used alone or as a mixture of two or more thereof.

The (iso or tertiary) and (iso) mean both the presence and absence of these groups, and when these groups are not present, normal is indicated.

From the viewpoint of water resistance, the aromatic ring-containing monomer is preferably at least one member selected from the group consisting of styrene, vinyl naphthalene, α-methyl styrene, vinyl toluene, ethyl vinyl benzene, 4-vinyl biphenyl, 1,1-diphenyl ethylene, benzyl (meth) acrylate, phenoxyethyl (meth)acrylate, 2-hydroxy-3-phenoxypropyl acrylate, 2-methacryloyloxyethyl-2-hydroxypropyl phthalate, 2-acryloyloxyethylphthalic acid and neopentyl glycol acrylic acid benzoate. In particular preferable are vinyl monomers having an aromatic hydrocarbon group having 6 to 22 carbon atoms, such as styrene, α-methyl styrene, vinyl toluene and vinyl naphthalene, from the viewpoint of water resistance and rub fastness.

The macromer includes a macromer having a polymerizable functional group at one terminal and a number-average molecular weight of preferably 500 to 500,000, more preferably 1,000 to 10,000.

Examples of the macromer include styrene-based macromers having a polymerizable functional group at one terminal, silicone-based macromers having a polymerizable functional group at one terminal, methyl methacrylate-based macromers having a polymerizable functional group at one terminal, styrene-acrylonitrile-based macromers having a polymerizable functional group at one terminal, butyl acrylate-based macromers having a polymerizable functional group at one terminal, isobutyl methacrylate-based macromers having a polymerizable functional group at one terminal, and the like. Among these, the styrene-based macromers having a polymerizable functional group at one terminal are preferable from the viewpoint of incorporation of the pigment into the vinyl polymer.

The styrene-based macromers having a polymerizable functional group at one terminal include styrene homopolymers having a polymerizable functional group at one terminal and styrene/other monomer copolymers having a polymerizable functional group at one terminal.

In the styrene/other monomer copolymers having a polymerizable functional group at one terminal, the other monomer includes acrylonitrile and the like. The styrene content is preferably 60% or more by weight, more preferably 70% or more by weight, from the viewpoint of sufficient incorporation of the pigment into the vinyl polymer.

The styrene-based macromer having a polymerizable functional group at one terminal is preferably a styrene-based macromer having an acryloyloxy group or methacryloyloxy group as a polymerizable functional group at one terminal.

Commercial styrene-based macromers include, for example, AS-6, AS-6S, AN-6, AN-6S, HS-6, HS-6S and the like. manufactured by Toagosei Chemical Industry Co., Ltd.

Among the silicone macromers, a silicone macromer represented by the following general formula (I) is preferable from the viewpoint of prevention of burning of a head in an ink jet printer.

$$X(Y)_q Si(R^3)_{3-r}(Z)_r \qquad (I)$$

wherein X is a polymerizable unsaturated group, Y is a divalent linking group, $R^3$s independently represent a hydrogen atom, a lower alkyl group, an aryl group or an alkoxy group, Z represents a monovalent siloxane polymer residue having a number-average molecular weight of 500 or more, q is 0 or 1, and r is an integer of 1 to 3.

In the silicone macromer represented by the general formula (I), X is a polymerizable unsaturated group, and typical examples include C2 to C6 monovalent unsaturated hydrocarbon groups such as $CH_2=CH-$, $CH_2=C(CH_3)-$, and the like.

Y is a divalent linking group, and typical examples include $-COO-$, $-COO(CH_2)_a-$ (a is an integer of 1 to 5) and divalent linking groups such as phenylene group. Among these, $-COOC_3H_6-$ is preferable.

$R^3$s independently represent a hydrogen atom, a lower alkyl group, an aryl group or an alkoxy group, and specific examples include a hydrogen atom; a C1 to C5 lower alkyl group such as methyl group, ethyl group and the like; a C6 to C20 aryl group such as phenyl group and the like; and a C1 to C20 alkoxy group such as methoxy group and the like. Among these, a methyl group is preferable.

Z is a monovalent siloxane polymer residue having a number-average molecular weight of 500 or more, and Z is preferably a monovalent dimethylsiloxane polymer residue having a number-average molecular weight of 500 to 5000.

q is 0 or 1, preferably 1. r is an integer of 1 to 3, more preferably 1.

Typical examples of the silicone macromer include silicone macromers represented by the following general formula (II), (III), (IV) and (V):

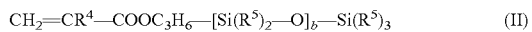  (II)

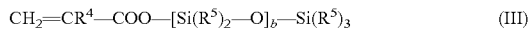  (III)

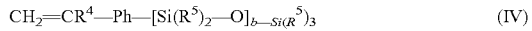  (IV)

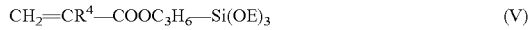  (V)

wherein the meaning of each symbol is as follows:

$R^4$ represents a hydrogen atom or a methyl group, $R^5$s independently represent a hydrogen atom or a C1 to C5 lower alkyl group, b is a number of 5 to 60, Ph represents a phenylene group, and E represents $-[Si(R^3)_2-O]_c-Si(R^4)_3$ group wherein $R^4$ has the same meaning as defined above, and c is a number of 5 to 65.

Preferable among these are the silicone macromers represented by the general formula (II), particularly the silicone macromers represented by the following general formula (II-1):

  (II-1)

wherein d is a number of 8 to 40. Specific examples include FM-0711 [trade name, manufactured by Chisso Corporation].

The number-average molecular weight of the macromer is measured by using polystyrene as standard in gel permeation chromatography using 1 mmol/L dodecyl dimethylamine—containing chloroform as solvent.

From the viewpoint of jetting ability and optical density, the content of the nonionic monomer (A) in the monomer mixture is preferably 5 to 45% by weight, more preferably 5 to 35% by weight, even more preferably 5 to 30% by weight.

From the viewpoint of the dispersion stability of the resulting dispersion, the content of the salt-forming group-containing monomer (B) in the monomer mixture is preferably 3 to 40% by weight, more preferably 5 to 30% by weight, even more preferably 7 to 25% by weight.

From the viewpoint of optical density and dispersion stability, the content of the hydrophobic monomer (C) in the monomer mixture is preferably 15 to 87% by weight, more preferably 35 to 85% by weight, even more preferably 40 to 83% by weight.

When the aromatic ring-containing monomer is used as monomer (C), the content of the aromatic ring-containing monomer in monomer (C) is preferably 1 to 100% by weight, more preferably 5 to 90% by weight, even more preferably 10 to 80% by weight, from the viewpoint of improving water resistance, rub fastness and dispersion stability.

When the macromer is used as monomer (C), the content of the macromer in monomer (C) is preferably 1 to 80% by weight, more preferably 2 to 60% by weight, even more preferably 5 to 40% by weight, from the viewpoint of improving water resistance and rub fastness.

The weight-average molecular weight of the water-insoluble vinyl polymer (a) and (b) (determined by a method described in Production. Examples 1 to 4 described later) is preferably 3,000 to 300,000, more preferably 5,000 to 200,000, from the viewpoint of optical density and jetting ability.

The water-insoluble vinyl polymer (a) and (b) is produced by polymerizing monomers by a known polymerization method such as bulk polymerization, solution polymerization, suspension polymerization and emulsion polymerization. Among these polymerization methods, solution polymerization is preferable.

The solvent used in solution polymerization is preferably a polar organic solvent. When the polar organic solvent is miscible with water, it can be used as a mixture with water.

The polar organic solvent includes fatty alcohols having 1 to 3 carbon atoms, such as ethanol and propanol, ketones such as acetone and methyl ethyl ketone, and esters such as ethyl acetate. Among these solvents, acetone, methyl ethyl ketone or a mixed solvent thereof with water is preferable.

In polymerization, a radical polymerization initiator can be used. The radical polymerization initiator is preferably an azo compound such as 2,2'-azobisisobutyronitrile, 2,2'-azobis(2,4-dimethylvarelonitrile), dimethyl-2,2'-azobisbutyrate, 2,2'-azobis(2-methylbutyronitrile) and 1,1'-azobis(1-cyclohexanecarbonitrile). An organic peroxide such as t-butyl peroxy octoate, di-t-butyl peroxide and dibenzoyl oxide can also be used.

The amount of the polymerization initiator is preferably 0.001 to 5 moles, more preferably 0.01 to 2 moles, per mole of the monomer mixture.

In polymerization, a polymerization chain transfer agent may be added. Examples of the polymerization chain transfer agent include mercaptans such as octyl mercaptan, n-dodecyl mercaptan, t-dodecyl mercaptan, n-tetradecyl mercaptan, 2-mercaptoethanol and the like; xanthogen disulfides such as dimethylxanthogen disulfide, diisopropylxanthogen disulfide and the like; thiuram disulfides such as tetramethylthiuram disulfide, tetrabutylthiuram disulfide and the like; halogenated hydrocarbons such as carbon tetrachloride, ethylene bromide and the like; hydrocarbons such as pentaphenyl ethane and the like; unsaturated cyclic hydrocarbon compounds such as acrolein, methacrolein, allyl alcohol, 2-ethylhexyl thioglycolate, terpinolene, α-terpinene, γ-terpinene, dipentene, α-methylstyrene dimer, 9,10-dihydroanthracene, 1,4-dihydronaphthalene, indene, 1,4-dicyclohexadiene and the like; and unsaturated heterocyclic compounds such as 2,5-dihydrofuran and the like. These polymerization chain transfer agents can be used singly or as a mixture of two or more thereof.

The conditions for polymerizing the monomer are varied depending on the type of the radical polymerization initiator, the monomer and the solvent used, and can thus not be determined sweepingly. Usually, the polymerization temperature is preferably 30 to 100° C., more preferably 50 to 80° C., and the polymerization time is preferably 1 to 20 hours. The polymerization atmosphere is preferably a nitrogen gas atmosphere or an inert gas atmosphere such as argon.

After the polymerization reaction is finished, the formed water-insoluble vinyl polymer can be isolated by a method known in the art by re-precipitation or distilling the solvent away from the reaction solution. The resulting water-insoluble vinyl polymer can be purified by repeating re-precipitation or by removing the unreacted monomer and the like by membrane separation, chromatography, extraction and the like.

From the viewpoint of a reduction in the viscosity of the aqueous ink, the solubility, in water at 25° C., of the water-insoluble vinyl polymer used in the invention after 100% neutralization with sodium hydroxide or acetic acid depending on the salt-forming group is preferably 10% or less by weight, more preferably 5% or less by weight, even more preferably 1% or less by weight.

The water-insoluble vinyl polymer-treated pigment obtained in the step 1 may be in the form of a wet cake after filtration and washing by known techniques or in the form of powder after filtration, washing, drying and milling by known techniques.

<Step 2>

Then, a mixture containing the water-insoluble vinyl polymer particle (a)—treated pigment obtained in step 1, an organic solvent, a water-insoluble vinyl polymer (b) and water, and optionally a neutralizing agent, is dispersed, and then the organic solvent is removed, whereby a water dispersion of pigment-containing water-insoluble vinyl polymer particles is obtained.

The water-insoluble vinyl polymers (a) and (b) may be preferably produced by polymerizing a monomer mixture containing the monomer (A), the monomer (B) and the monomer (C). In order to obtain an aqueous ink for ink jet recording being excellent in dispersion stability and jetting ability, the weight proportion of the monomer (A), the monomer (B) and the monomer (C), respectively, are preferably the same as one another. The water-insoluble vinyl polymers (a) and (B) may have preferably the same monomer compositions as each other in view of the kinds of monomers and the monomer weight contents.

The treatment method in this step is preferably a method wherein a water-insoluble vinyl polymer (b) is dissolved in an organic solvent and then mixed with a mixture of the water-insoluble vinyl polymer particle (a)—treated pigment obtained in the previous step and water, optionally a neutralizing agent and a surfactant. The mixture is then diluted with water if necessary, and the organic solvent is distilled away to convert it to an aqueous system and obtain a water dispersion of the pigment-containing water-insoluble vinyl polymer particles.

In the mixture the content of the pigment treated with the water-insoluble vinyl polymer particle (a) is preferably 5 to 50% by weight; that of the organic solvent is preferably 5 to 50% by weight; that of the water-insoluble vinyl polymer particle (b) is preferably 2 to 40% by weight; and that of water is preferably 10 to 70% by weight.

For dispersing the mixture, a generally used mixing stirring device such as an anchor wing can be used. The mixing stirring device is preferably a high-speed stirring mixing device such as Ultradisper [trade name, manufactured by Asada Tekko Co., Ltd.], Ebara Milder [trade name, manufactured by Ebara Seisakusho Co., Ltd.], TK homomixer, TK pipeline mixer, TK homojetter, TK homomic line flow and Filmix [trade names, Tokushu Kika Kogyo Co., Ltd.], Clearmix [M Technic Co., Ltd.], KD mill [trade name, Kinetic Dispersion Co., Ltd.] and the like.

Further, shear stress is preferably applied to effect secondary dispersion until the particle diameter is reduced to a desired size.

A means to apply shear stress for secondary dispersion includes, for example, a kneading machine such as a roll mill, kneader, extruder and the like, a high-pressure homogenizer [trade name, manufactured by Izumi Hood Machinery Co., Ltd.], a high-pressure homogenizer in a homo-valve system represented by Minilabo 8.3H type [trade name, manufactured by Rannie], a high-pressure homogenizer in a chamber system, such as Microfluidizer [trade name, manufactured by Microfluidics], Nanomizer [trade name, manufactured by Nanomizer Co., Ltd.], Altymizer [trade name, manufactured by Sugino Machine Limited], Genus PY [trade name, manufactured by Hakusui Kagaku Co., Ltd.], DeBEE2000 [trade name, manufactured by Nippon BEE] and the like, but the invention is not limited thereto. Among these, a high-pressure homogenizer is preferable from the viewpoint of finely dividing the pigment contained in the mixture.

The temperature for dispersing the mixture is not particularly limited, but is usually preferably 5 to 50° C.

From the viewpoint of dispersion stability, the mixture is dispersed until the average particle diameter of the pigment-containing water-insoluble polymer after dispersion is reduced preferably to 0.01 to 0.20 μm, more preferably 0.03 to 0.15 μm.

Then, the organic solvent contained in the dispersion of the pigment-containing polymer particles is removed desirably by a general method of removing a solvent such as distillation under reduced pressure, whereby a water dispersion of the pigment-containing water-insoluble polymer particles is obtained.

The form of the pigment-containing water-insoluble polymer particles is not particularly limited insofar as the particles are formed from the pigment and the water-insoluble polymer, and for example, mention is made of the form of particles having the pigment included in the water-insoluble polymer, the form of particles having the pigment dispersed uniformly in the water-insoluble polymer, and the form of particles having a part of the pigment contained in the water-insoluble polymer and the rest of the pigment exposed to the surface of the particle. The water dispersion of the pigment-containing water-insoluble polymer particles is the one wherein the pigment-containing water-insoluble polymer particles are dispersed as solids in a solvent based on water.

The amount of the water-insoluble vinyl polymer (b) used in step 2 is preferably 10 to 95% by weight, more preferably 40 to 90% by weight, of the total amount of the water-insoluble vinyl polymers used in the steps 1 and 2, that is, that of (a) and (b).

From the viewpoint of dispersion stability and jetting ability, the amount of the water-insoluble vinyl polymer (b) used in step 2 is preferably 5 to 100% by weight, relative to 100 parts by weight of the water-insoluble vinyl polymer particle (a)—treated pigment, the total amount of the water-insoluble vinyl polymer and the pigment.

Preferable examples of the organic solvent include alcohol solvents, ketone solvents, and ether solvents, wherein the solubility in water at 20° C. is preferably 50% or less by weight.

The alcohol solvents include ethanol, isopropanol, n-butanol, tert-butanol, iso-butanol, diacetone alcohol and the like.

The ketone solvents include acetone, methyl ethyl ketone, diethyl ketone, methyl isobutyl ketone and the like. The ether solvents include dibutyl ether, tetrahydrofuran, dioxane and the like. Among these solvents, isopropanol, acetone and methyl ethyl ketone are preferable.

If necessary, the organic solvent may be used in combination with a high-boiling hydrophilic organic solvent. The high-boiling hydrophilic organic solvent includes phenoxyethanol, ethylene glycol monomethyl ether, diethylene glycol monomethyl ether, diethylene glycol monomethyl ether, diethylene glycol diethyl ether and the like.

As the neutralizing agent, an acid or base can be used depending on the type of the salt-forming group. The acid includes inorganic acids such as hydrochloric acid and sulfuric acid, and organic acids such as acetic acid, propionic acid, lactic acid, succinic acid, glycolic acid, gluconic acid and glycerin acid. The base includes tertiary amines such as trimethylamine and triethylamine, ammonia, and alkali metal or alkaline earth metal hydroxides such as sodium hydroxide and potassium hydroxide.

The degree of neutralization is not particularly limited. Usually, the pH value of the resulting water dispersion is preferably in the range of 4.5 to 10.

The water dispersion for ink jet recording in the invention is obtained by the process described above. From the viewpoint of prevention of nozzle clogging and dispersion stability, the average particle diameter of the pigment-containing water-insoluble vinyl polymer particles is preferably 0.01 to 0.50 μm, more preferably 0.02 to 0.30 μm, even more preferably 0.05 to 0.20 μm. The average particle diameter corresponds to the "average particle diameter before storage" shown in the Examples and determined by a method described in the Examples.

In the invention, the aqueous ink for ink jet recording can be prepared by incorporating additives such as a water-soluble organic solvent, a wetting agent, a dispersant, a defoaming agent, a preservative and a chelating agent if necessary into the water dispersion of the pigment-containing water-insoluble polymer particles for ink jet recording in the invention.

The water-soluble organic solvent includes monoalcohol compounds such as methanol, ethanol, 1-propanol, 2-propanol, 1-butanol, 2-butanol, 2-methyl-1-propanol, 2-methyl-2-propanol, 1-pentanol, 2-pentanol, 3-pentanol 2-methyl-1-butanol, 3-methyl-1-butanol, 2-methyl-2-butanol and 3-methyl-2-butanol, polyvalent alcohol compounds such as ethylene glycol, polyethylene glycol, propylene glycol, triethylene glycol, polytriethylene glycol, tetraethylene glycol, polytetraethylene glycol, 1,3-butanediol, glycerin and 1,2,6-hexanetriol, ketones such as acetone and methyl ethyl ketone, and esters such as ethyl acetate. These water-soluble organic solvents may be used alone or as a mixture of two or more water-soluble organic solvents. The amount of these water-soluble organic solvents added, including the water-soluble organic solvent transferred from the pigment dispersion, is preferably 1 to 50% by weight in the aqueous ink.

As the wetting agent, it is possible to employ polyvalent alcohols such as ethylene glycol, propylene glycol, diethylene glycol, triethylene glycol, polyethylene glycol, glycerin, diethylene glycol diethyl ether and diethylene glycerin mono-n-butyl ether, ethers thereof, acetates, and nitrogen-containing compounds such as N-methyl-2-pyrrolidone and 1,3-dimethyl imidazolidinone. The amount of the wetting agent in the aqueous ink is preferably 0.1 to 50% by weight, more preferably 0.1 to 30% by weight.

As the dispersant, an anionic, nonionic, cationic or amphoteric surfactant can be used.

From the viewpoint of optical density and jetting ability, it is usually desired that the amount (solids content) of the pigment-containing water-insoluble vinyl polymer particles in the water dispersion for ink jet recording and the aqueous ink in the present invention is regulated in the range of preferably 0.5 to 30% by weight, more preferably 1 to 20% by weight, even more preferably 2 to 15% by weight. The content of water in the water dispersion and the aqueous ink is preferably 40 to 90% by weight, more preferably 50 to 80% by weight.

By using the pigment treated with the water-insoluble vinyl polymer particles, the aqueous ink for ink jet recording in the invention becomes an aqueous ink excellent in dispersion stability and jetting ability. It is estimated that the water-insoluble vinyl polymer particles highly adsorb on the pigment, based on the hydrophobic interaction between the water-insoluble vinyl polymer particles and the pigment to prevent the pigment from agglomeration and reduce coarse particles in the aqueous ink.

By using the water-insoluble vinyl polymers (a) and (b) obtained by polymerizing the monomer mixture of (A), (B) and (C), above mentioned, the aqueous ink for ink jetting recording having can be obtained with an excellent dispersion stability and jetting ability.

It is estimated that this is caused by a good compatibility between the water-insoluble vinyl polymer particles (a) used to treat the pigment and the water-insoluble vinyl polymer particles (b) used to produce a water dispersion of the pigment-containing water-insoluble vinyl polymer particles.

The aqueous ink for ink jet recording in the invention is endowed with high hydrophilicity to prevent it from penetrating into a paper having a hydrophilic surface, thus permitting the pigment to remain effectively on the surface of the paper to achieve high optical density.

EXAMPLES

Production Examples 1 to 5 and Comparative Production Example 1

3 parts by weight of methyl ethyl ketone, 0.03 part by weight of a polymerization chain transfer agent (2-mercaptoethanol), and 10% by weight of the amount of each monomer as shown in Table 1 (unit: parts by weight) were introduced into and mixed in a reaction container, and then purged sufficiently with a nitrogen gas to give a mixed solution.

Separately, a dropping funnel was charged with 90% by weight of the amount of each monomer as shown in Table 1 (unit: parts by weight) and then 0.27 part by weight of a polymerization chain transfer agent (2-mercaptoethanol), 40 parts by weight of methyl ethyl ketone and 1.2 parts by weight of 2,2'azobis(2,4-dimethylvaleronitrile) were mixed therewith and purged sufficiently with a nitrogen gas to give a mixed solution.

The mixed solution in the reaction container was heated under stirring to 65° C. in a nitrogen atmosphere, and the mixed solution in the dropping funnel was added dropwise to the reaction container over 3 hours. After this dropwise addition, the mixed solution was kept at a temperature of 65°

C. for 2 hours, and then a solution of 0.3 part by weight of 2,2'-azobis(2,4-dimethylvaleronitrile) dissolved in 5 parts by weight of methyl ethyl ketone was added to the mixed solution and aged at 65° C. for 2 hours and at 70° C. for 2 hours to give a polymer solution.

A part of the resulting polymer solution was dried at 105° C. for 2 hours under reduced pressure to remove the solvent, whereby the polymer was isolated. The weight-average molecular weight of the polymer was determined by gel permeation chromatography with polystyrene as a standard and dimethyl formamide containing 60 mmol/L phosphoric acid and 50 mmol/L lithium bromide as a solvent.

The compounds shown in Table 1 are as follows:

Methoxypolyethylene glycol monomethacrylate (EO=4 moles) trade name, NK Ester M-40G, manufactured by Shin-Nakamura Chemical Co., Ltd.

Methoxypolyethylene glycol monomethacrylate (EO=23 moles) trade name, NK Ester M230H, manufactured by Shin-Nakamura Chemistry Co., Ltd.

Polypropylene glycol monomethacrylate (PO=9 moles): trade name, Blenmer PP-500, manufactured by Nippon Oil and Fats Co., Ltd.

Octoxy (polyethylene glycol-propylene glycol) monomethacrylate (EO=8 moles, PO=6 moles) : trade name, Blenmer 50POEP-800B, manufactured by Nippon Oil and Fats Co., Ltd.

Styrene macromonomer: trade name, AS-6S, number-average molecular weight: 6000, polymerizable functional group: methacryloyloxy group, manufactured by Toagosei Chemical Industry Co., Ltd.

suspension of the coupling component was dropped thereto at 15° C. within 1.5 to 2 hours, to give a pigment. In the resulting pigment suspension in the aqueous solvent, the content of the pigment was 5.7% by weight, and the average particle diameter of the pigment was 10 µm.

Then, 45 parts of the polymer obtained by vacuum-drying the polymer solution obtained in each of Production Examples 1 to 5 were dissolved in 405 parts by weight of methyl ethyl ketone, then its salt-forming groups were neutralized by adding a predetermined amount (70 mole % of neutralizing degree) of a neutralizing agent (20% aqueous sodiumhydroxide), 1080 parts by weight of deionized water were added thereto, and the mixture was stirred. Thereafter, the methyl ethyl ketone was removed under reduced pressure, and a part of the water was removed, where by a water dispersion of the water-insoluble vinyl polymer particles with a solids content of 20% by weight was obtained. The average particle diameter of the water-insoluble vinyl polymer particles is shown in Table 1.

The pigment suspension in the aqueous solvent was made alkaline (pH 9) with sodium hydroxide, and then 7539.6 parts by weight of the pigment suspension in the aqueous solvent were mixed with 225 parts by weight of the water dispersion of water-insoluble vinyl polymer particles, and the resulting polymer-treated pigment was filtered, washed with water, dried and milled to give 463 parts by weight of yellow water-insoluble vinyl polymer-treated pigment (referred to hereinafter as polymer-treated pigment). The pigment suspension was added to the water dispersion of the water-insoluble vinyl polymer particles in such a ratio that

TABLE 1

| | | | Production example No. | | | | | Comparative production |
|---|---|---|---|---|---|---|---|---|
| | | | 1 | 2 | 3 | 4 | 5 | example 1 |
| Type of monomer | (A) | Methoxypolyethylene glycol monomethacrylate (EO = 4 moles) | 25 | 0 | 0 | 0 | 0 | 0 |
| | | Methoxypolyethylene glycol monomethacrylate (EO = 23 moles | 0 | 10 | 0 | 0 | 5 | 30 |
| | | Polypropylene glycol monomethacrylate (PO = 9 moles) | 0 | 15 | 0 | 0 | 20 | 0 |
| | | Octoxy (poly-ethylene glycol/poly-propylene glycol) monomethacrylate (EO = 8 moles, PO = 6 moles) | 0 | 0 | 25 | 25 | 0 | 0 |
| | (B) | Methacrylate acid | 14 | 14 | 16 | 14 | 14 | 50 |
| | (C) | Butyl methacrylate | 0 | 0 | 10 | 0 | 0 | 0 |
| | | Styrene monomer | 46 | 46 | 34 | 46 | 46 | 20 |
| | | Styrene macromer | 15 | 15 | 15 | 15 | 15 | 0 |
| Weight-average molecular weight | | | 60000 | 55000 | 63000 | 70000 | 76000 | 40000 |
| Degree of neutralization (%) | | | 100 | 100 | 100 | 100 | 100 | 100 |
| Average perticle diameter (µm) of water insoluble vinyl polymer particles | | | 0.23 | 0.20 | 0.25 | 0.31 | 0.27 | — |

Examples 1 to 5

182.7 parts by weight of 2-methoxy-4-nitro-aniline and 5.1 parts by weight of 2-nitro-4-methylaniline were added to a mixture of 1300 parts by weight of water and 290 parts by weight of 35% hydrochloric acid, then cooled to 0° C. and converted into a diazo derivative by adding 80 parts by weight of sodium nitrite, to give a diazo solution.

Separately, 241.8 parts by weight of 2-methoxyacetoacetoanilide were added to 5000 parts by weight of water, then dissolved together with 48 parts by weight of sodium hydroxide, and then precipitated by adding a mixed solvent of 196 parts by weight of acetic acid 196 parts by weight of water, to give a coupling component suspension. While the above diazo solution was stirred well, the acetic acid acidic 100 parts by weight of the pigment were mixed with 10.5 parts by weight of the water-insoluble vinyl polymer particles.

A polymer solution having absolutely the same composition as that of the water-insoluble vinyl polymer used in production of the polymer-treated pigment was dried under reduced pressure, and 5.1 g of the dried polymer was dissolved in 45 parts by weight of methyl ethyl ketone, and a predetermined amount (70 mole % of neutralizing degree) of a neutralizing agent (20% aqueous sodium hydroxide) was added to neutralize its salt-forming groups, and 24.9 parts by weight of the polymer-treated pigment obtained above were added thereto, and the mixture was kneaded with a beads mill for 2 hours.

120 parts by weight of deionized water were added to the resulting kneaded material and then stirred, and the methyl ethyl ketone was removed under reduced pressure at 60° C., and a part of the water was further removed, whereby a water dispersion of the pigment-containing water-insoluble vinyl polymer particles with a solids content of 20% by weight was obtained. The average particle diameter of the pigment-containing water-insoluble vinyl polymer particles is shown in Table 2.

The resulting water dispersion was used to prepare an aqueous ink. The ink composition is shown below.

| | |
|---|---|
| Pigment dispersion | 30% by weight |
| Glycerin | 10% by weight |
| Triethylene glycol monobutyl ether | 7% by weight |
| Surfinol 465 (produced by Aero Products) | 1% by weight |
| Ploxel XL2 (S) (produced by AVICIA) | 0.08% by weight |
| Deionized water | 51.92% by weight |

These components were mixed, and the resulting mixture was filtered with a needle-free syringe with a volume of 25 mL [produced by Terumo] equipped with a 0.5 μm filter [acetyl cellulose membrane, external diameter 2.5 cm, produced by Fuji Photo Film Co., Ltd.] to remove coarse particles to give an aqueous ink having a composition shown in Table 2.

Example 6

The aqueous ink shown in Table 2 was obtained by the same treatment as in Example 1 except that the vinyl polymer in Production Example 1 was used in production of the polymer-treated pigment, and the vinyl polymer in Production Example 4 was used in production of the dispersion of the pigment-containing vinyl polymer particles.

Comparative Example 1

The aqueous ink shown in Table 2 was obtained by using the vinyl polymer in Production Example 4 in the same treatment as in Example 1 except that the water-insoluble vinyl polymer was not added before the step of drying the pigment.

Comparative Example 2

The aqueous ink shown in Table 2 was obtained in the same treatment as in Example 1 except that the water-soluble vinyl polymer in Comparative Production Example 1 was used.

Then, the physical properties of the resulting aqueous inks were evaluated according to the following methods. The results are shown in Table 2.

(1) Average Particle Diameter and Dispersion Stability

The average particle diameter (referred to hereinafter as "average particle diameter before storage") of the pigment-containing polymer particles contained in the ink was measured by laser particle analysis system ELS-8000 (cumulant method) manufactured by Ohtsuka Electronics Co., Ltd. The ink was placed in a closed container, stored for 1 month in a thermostatic bath at 60° C., and measured for average particle diameter (referred to hereinafter as "average particle diameter after storage") in the same manner. As an indicator of dispersion stability, the dispersion stability was determined according to the following equation, and evaluated according to the following criteria.

Dispersion stability (%)=([average particle diameter after storage]/[average particle diameter before storage])×100

[Evaluation Criteria]
⊙: 95% or more to less than 105% dispersion stability.
○: 90% or more to less than 95%, or 105% or more to less than 110%, dispersion stability.
Δ: 70% or more to less than 90%, or 110% or more to less than 130%, dispersion stability.
x: Less than 70%, or 130% or more, dispersion stability.

(2) Jetting Ability

Using a commercial ink jet printer (model number: EM900C) manufactured by Epson, ink jetting was evaluated according to the following criteria.

[Evaluation Criteria]
○: Excellent in jetting in all nozzles.
Δ: Inferior in jetting in some nozzles.
x: Inferior in jetting.

(4) Optical Density

Using the above printer, a commercial copy paper was subjected to solid image printing and then left at 25° C. for 1 hour, and the optical density was measured with a Mac-Beth densitometer (model number: RD914, manufacture by MacBeth) and evaluated according to the following evaluation criteria.

[Evaluation Criteria]
⊚: 1.2 or more optical density.
○: 1.1 or more to less than 1.2 optical density.
Δ: 1.0 or more to less than 1.1 optical density.
x: Less than 1.0 optical density.

(5) Light Fastness

The above solid image print measured for optical density as described above was irradiated in 10000 counts with Xenon Fade Meter (trade name, manufactured by ATLAS), and then the optical density of the same part as measured before irradiation was measured again with MacBeth densitometer RD914. The residual degree of the optical density after irradiation, relative to the optical density before irradiation, was determined according to the following equation, and light fastness was evaluated according to the following evaluation criteria.

Residual degree (%)=([optical density after irradiation]/[optical density before irradiation])×100

[Evaluation Criteria]
⊚: 95% or more residual degree.
○: 80% or more to less than 95% residual degree.
Δ: 60% or more to less than 80% residual degree.
x: Less than 60% residual degree.

(6) Light Resistance

Using the above printer, a commercial copy paper was subjected to solid printing and then dried at 25° C. for 1 hour, and the optical density of a predetermined part in the paper was measured, dipped for 10 seconds vertically in stationary water for 10 seconds and then raised vertically. After air-drying at 25° C. for 24 hours, the optical density of the same part as measured before dipping was measured, and the residual degree of the printing plate after dipping, relative to the optical density before dipping, was determined according to the following equation, and water resistance was evaluated according to the following criteria.

Residual degree (%)=([optical density after dipping]/ [optical density before dipping])×100

[Evaluation Criteria]
⊚: 95% or more residual degree.
○: 80% or more to less than 95% residual degree.
Δ: 60% or more to less than 80% residual degree.
x: Less than 60% residual degree.

(7) Rub Fastness

Using the above printer, a commercial copy paper was subjected to solid printing and dried at 25° C. for 24 hours, and the printed surface was strongly rubbed with fingers, and the degree of removal of the printed ink was evaluated according to the following criteria.

[Evaluation Criteria]
⊚: No removal of the printed ink.
○: Hard removal of the printed ink, and no staining therearound.
Δ: Slight removal of the printed ink by rubbing, slight staining therearound, and slight staining on fingers.
x: Significant removal of the printed ink by rubbing, significant staining therearound, and considerable staining on fingers.

(Step 2) a step of obtaining a water dispersion of pigment-containing water-insoluble vinyl polymer particles by dispersing a mixture comprising the water-insoluble vinyl polymer particle (a)—treated pigment obtained in step 1, an organic solvent, (b) a water-insoluble vinyl polymer and water and then removing the organic solvent.

2. The process according to claim 1, wherein in step 1, the water-insoluble vinyl polymer is used in an amount of 1 to 100 parts by weight per 100 parts by weight of the pigment.

3. The process according to claim 1, wherein the water-insoluble vinyl polymers (a) and (b) comprise a polymer obtained by polymerizing a monomer mixture comprising (A) a nonionic monomer, (B) a salt-forming group-containing monomer and (C) a hydrophobic monomer.

4. The process according to claim 1 or 2, wherein the water-insoluble vinyl polymers (a) and (b) have the same monomer composition as each other.

5. The process according to claim 3, wherein the hydrophobic monomer (C) comprises at least one member selected from the group consisting of an alkyl(meth)acrylate, an aromatic ring-containing monomer and a macromer.

TABLE 2

| | | | Examples | | | | | | Comparative examples | |
|---|---|---|---|---|---|---|---|---|---|---|
| | | | 1 | 2 | 3 | 4 | 5 | 6 | 1 | 2 |
| Ink composition | Type of water-insoluble vinyl polymer | (a) | Production example 1 | Production example 2 | Production example 3 | Production example 4 | Production example 5 | Production example 1 | — | Comparative production example 1 |
| | | (b) | Production example 1 | Production example 2 | Production example 3 | Production example 4 | Production example 5 | Production example 4 | Production example 4 | Comparative production example 1 |
| | Solids content (wt %) of the water dispersion of pigment-containing water-insoluble vinyl polymer particles | | 6.0 | 6.0 | 6.0 | 6.0 | 6.0 | 6.0 | 6.0 | 6.0 |
| | Glycerin | | 10.0 | 10.0 | 10.0 | 10.0 | 10.0 | 10.0 | 10.0 | 10.0 |
| | Triethylene glycol monobutyl ether | | 7.0 | 7.0 | 7.0 | 7.0 | 7.0 | 7.0 | 7.0 | 7.0 |
| | Surfinol 465 | | 1.0 | 1.0 | 1.0 | 1.0 | 1.0 | 1.0 | 1.0 | 1.0 |
| | Ploxel XL2 (S) | | 0.08 | 0.08 | 0.08 | 0.08 | 0.08 | 0.08 | 0.08 | 0.08 |
| | Ion-exchange water | | 75.92 | 75.92 | 75.92 | 75.92 | 75.92 | 75.92 | 75.92 | 75.92 |
| Measurement items | Dispersion stability | | ⊚ | ⊚ | ⊚ | ⊚ | ⊚ | ○ | Δ | X |
| | Jetting ability | | ○ | ○ | ○ | ○ | ○ | ○ | ○ | X |
| | Optical density | | ○ | ⊚ | ⊚ | ⊚ | ⊚ | ⊚ | Δ | X |
| | Light fastness | | ○ | ○ | ○ | ○ | ○ | ○ | ○ | ○ |
| | Water resistance | | ○ | ○ | ○ | ○ | ○ | ○ | ○ | Δ |
| | Rub fastness | | ○ | ○ | ○ | ○ | ○ | ○ | ○ | X |
| | Average perticle diameter (μm) | | 0.12 | 0.10 | 0.12 | 0.12 | 0.13 | 0.14 | 0.18 | 0.24 |

Surfinol 465: an activator manufactured by Aero Products
Ploxel XL2: preservative manufactured by ZENECA As can be seen from the results shown in Table 2, any aqueous inks obtained in the Examples are excellent in dispersion stability and jetting ability, give prints of high optical density on copy paper and are also excellent in light fastness, water resistance and rub fastness.

The invention claimed is:

1. A process for producing a water dispersion for ink jet recording, which comprises the following steps 1 and 2:
(Step 1) a step of obtaining a pigment treated with (a) water-insoluble vinyl polymer particles by mixing a pigment suspension in an aqueous solvent and (a) water-insoluble vinyl polymer particles dispersed in an aqueous solvent and then removing the solvent; and 6. The process according to claim 5, wherein the macromer is a styrene macromer having a polymerizable functional group at one terminal thereof.

7. The process according to claim 1, wherein the pigment is an azo and/or disazo pigment.

8. A water dispersion for ink jet recording, which is obtained by the process described in claim 1 or 2.

9. An aqueous ink for ink jet recording, which comprises the water dispersion described in claim 7.

10. The process according to claim 1, wherein the average particle diameter of the pigment is 1 to 50 μm.

11. The process according to claim 1, wherein the average particle diameter of the water-insoluble vinyl polymer is 0.03 to 10 μm.

* * * * *